(12) United States Patent
Shoji

(10) Patent No.: US 8,674,635 B2
(45) Date of Patent: Mar. 18, 2014

(54) NOISE REDUCTION DEVICE FOR STARTER

(75) Inventor: Yoichi Shoji, Anjo (JP)

(73) Assignee: Denso Corporation, Kariya (JP)

( * ) Notice: Subject to any disclaimer, the term of this patent is extended or adjusted under 35 U.S.C. 154(b) by 4 days.

(21) Appl. No.: 13/482,386

(22) Filed: May 29, 2012

(65) Prior Publication Data

US 2012/0306301 A1    Dec. 6, 2012

(30) Foreign Application Priority Data

May 31, 2011  (JP) ................................. 2011-121734

(51) Int. Cl.
*H02P 6/00*   (2006.01)

(52) U.S. Cl.
USPC ........ 318/400.24; 318/128; 318/139; 310/71; 310/51; 123/179.24

(58) Field of Classification Search
USPC ............. 123/179.24; 310/71, 51; 318/400.24, 318/128, 139
See application file for complete search history.

(56) References Cited

U.S. PATENT DOCUMENTS 4,237,508 A * 12/1980 Woods et al. .................... 361/24
7,126,295 B2 * 10/2006 Kim et al. ...................... 318/139

FOREIGN PATENT DOCUMENTS

DE    10 2008 001 570 A1   11/2009

* cited by examiner

*Primary Examiner* — Eduardo Colon Santana
*Assistant Examiner* — Iftekhar Mustafa
(74) *Attorney, Agent, or Firm* — Oliff PLC

(57) ABSTRACT

A noise reduction device for a starter includes a positive electrode connected to a power supply line via a branch wire, a grounding electrode connected to ground via a motor body of a motor, two capacitors connected in parallel with each other between the positive electrode and the grounding electrode, and a resin package into which the positive electrode and the grounding electrode are inserted and fixed. The package holds the two capacitors. The two capacitors include a capacitor body and two lead terminals extracted from the capacitor body in the same direction with respect to the capacitor body. The two capacitors are arranged in such a direction that the lead terminals of one thereof face the lead terminals of the other thereof across the positive electrode and the grounding electrode. The two lead terminals are joined to the positive electrode and the grounding electrode by welding.

6 Claims, 2 Drawing Sheets

NOISE REDUCTION DEVICE FOR STARTER

CROSS-REFERENCE TO RELATED APPLICATION

This application is based on and claims the benefit of priority from earlier Japanese Patent Application No. 2011-121734 filed May 31, 2011, the description of which is incorporated herein by reference.

BACKGROUND OF THE INVENTION

1. Technical Field of the Invention

The present invention relates to a noise reduction device for reducing noise produced on rotation of a motor mounted in a starter.

2. Related Art

Recently, in order to reduce carbon dioxide emitted by a vehicle and to improve fuel efficiency, these is an increase in a vehicle with a function to cut fuel supply to an engine to automatically stop an engine on stopping at a signal light at an intersection. This function is also called an "idling stop function". By this function, the engine is stopped. After that, a start operation is carried out by a user. In response to the start operation, a starter is activated by instruction of an ECU (electronic control unit) to automatically restart the engine.

On the other hand, in a starter using a commutator motor, a spark may be generated between a commutator and a brush during rotation of the motor. The spark causes noise to be generated in devices such as radios, which gives a user a sense of discomfort.

With respect to such a problem, DE-A-102008001570 discloses a technique for suppressing noise generated from the motor by using a capacitor circuit with at least one capacitor connected in parallel with the motor.

In the capacitor circuit disclosed in DE-A-102008001570, the capacitor is connected to an electrode by soldering. In a starter used under environment of severe temperature conditions, cracks can be produced by thermal fatigue during soldering to cause malfunction of a noise reduction device itself.

In order to increase performance of the noise reduction device, a capacitor with large capacitance may be needed. In this case, a plurality of capacitors are required to be built in a circuit. This induces an increase in man-hour. It is thus desired to efficiently assemble the plurality of capacitors at low cost.

SUMMARY

The present disclosure provides a noise reduction device for a starter, which is able to tolerate a use under environment of severe temperature conditions and to efficiently assemble a plurality of capacitors at low cost.

According to an aspect of the present disclosure, there is provided a noise reduction device for a starter provided with a motor and an electromagnetic switch. The motor is connected to a power supply line via a motor lead line and produces torque by power supplied from a battery. The electromagnetic switch includes an electric contact which is connected to the power supply line via a battery-side terminal and a motor-side terminal, and opens and closes the electric contact in conjunction with on-off operation of a solenoid. The noise reduction device includes: a positive electrode that is connected to the power supply line via a branch wire; a grounding electrode that is connected to ground via a motor body of the motor; two capacitors that are connected in parallel with each other between the positive electrode and the grounding electrode; and a package into which the positive electrode and the grounding electrode are inserted and fixed, the package holding the two capacitors. The two capacitors include a capacitor body and two lead terminals that are extracted from the capacitor body in the same direction with respect to the capacitor body. The two capacitors are arranged in such a direction that the two lead terminals of one of the two capacitors face the two lead terminals of the other of the two capacitors across the positive electrode and the grounding electrode. The two lead terminals are joined to the positive electrode and the grounding electrode by welding.

According to the noise reduction device, the lead terminals of the two capacitors are joined to the second positive electrode and the grounding electrode by not soldering but welding. Due to this, even if the noise reduction device is applied to the starter that may be used under an environment of severe temperature conditions, crack cannot be produced in the junction areas of the lead terminals, thereby being able to tolerate severe cold conditions.

The two capacitors are arranged in a direction where the lead terminals of one of the capacitors face the lead terminals of the other of the capacitors across the second positive electrode and the grounding electrode. According to this, two junction areas of the lead terminals with the second positive electrode can be adjacent to two junction areas of the lead terminals with the grounding electrode. Due to this, a total of four junction areas of the lead terminals of the respective capacitors with the second positive electrode and the grounding electrode can be joined in a single welding process, thereby being able to efficiently assemble the capacitors at low cost.

In the noise reduction device for the starter, the positive electrode may be connected to the motor-side terminal via the branch wire. The grounding electrode may be fixed to an end frame of the motor by a screw.

According to this configuration, the noise reduction device can be arranged near the motor to be a noise source. The grounding electrode is fixed to the end frame of the motor by the screw. Due to this, a ground line can be shortened, thereby being able to efficiently reduce noise.

DETAILED DESCRIPTION OF PREFERRED EMBODIMENTS

Referring to the accompanying drawings, a noise reduction device for a starter according to an exemplary embodiment of the present invention will now be described below.

Figure 1:
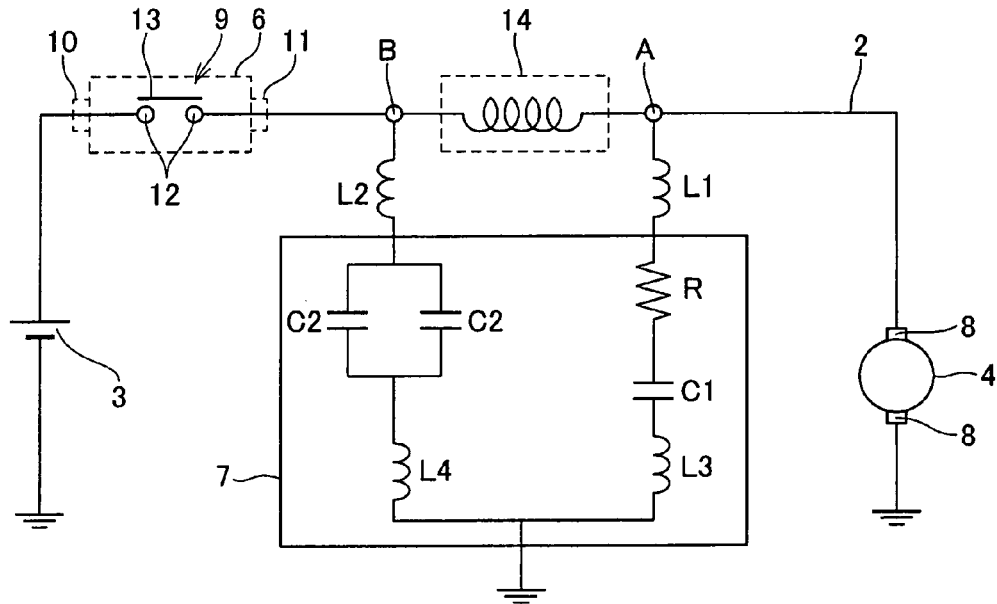
FIG. 1 is a motor circuit diagram of a starter using a noise reduction device according to an embodiment of the present invention.
Figure 2:
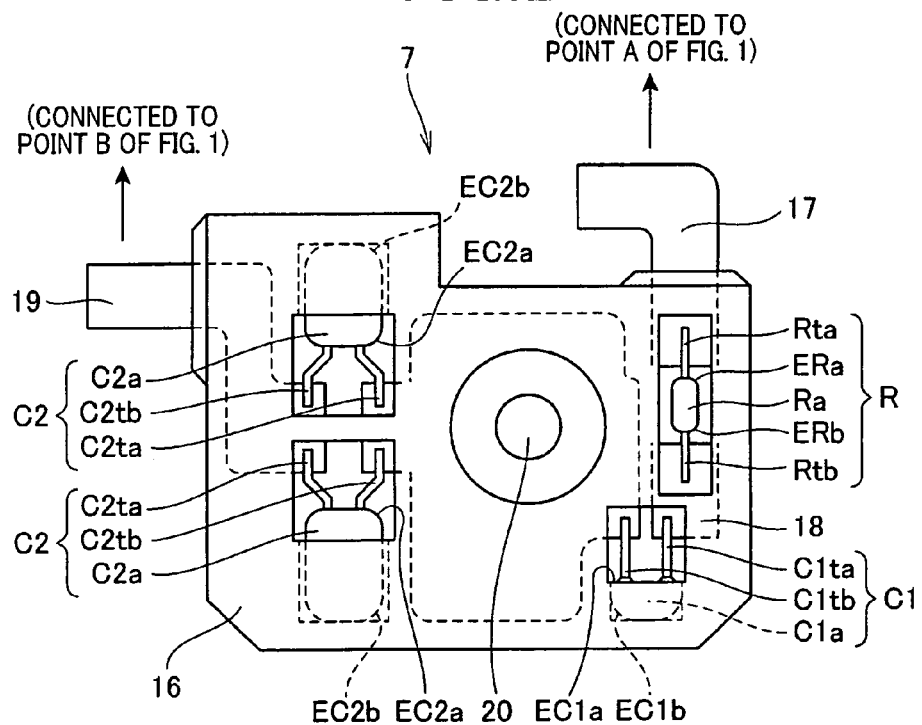
FIG. 2 is a plan view of the noise reduction device in FIG. 1.
Figure 3:
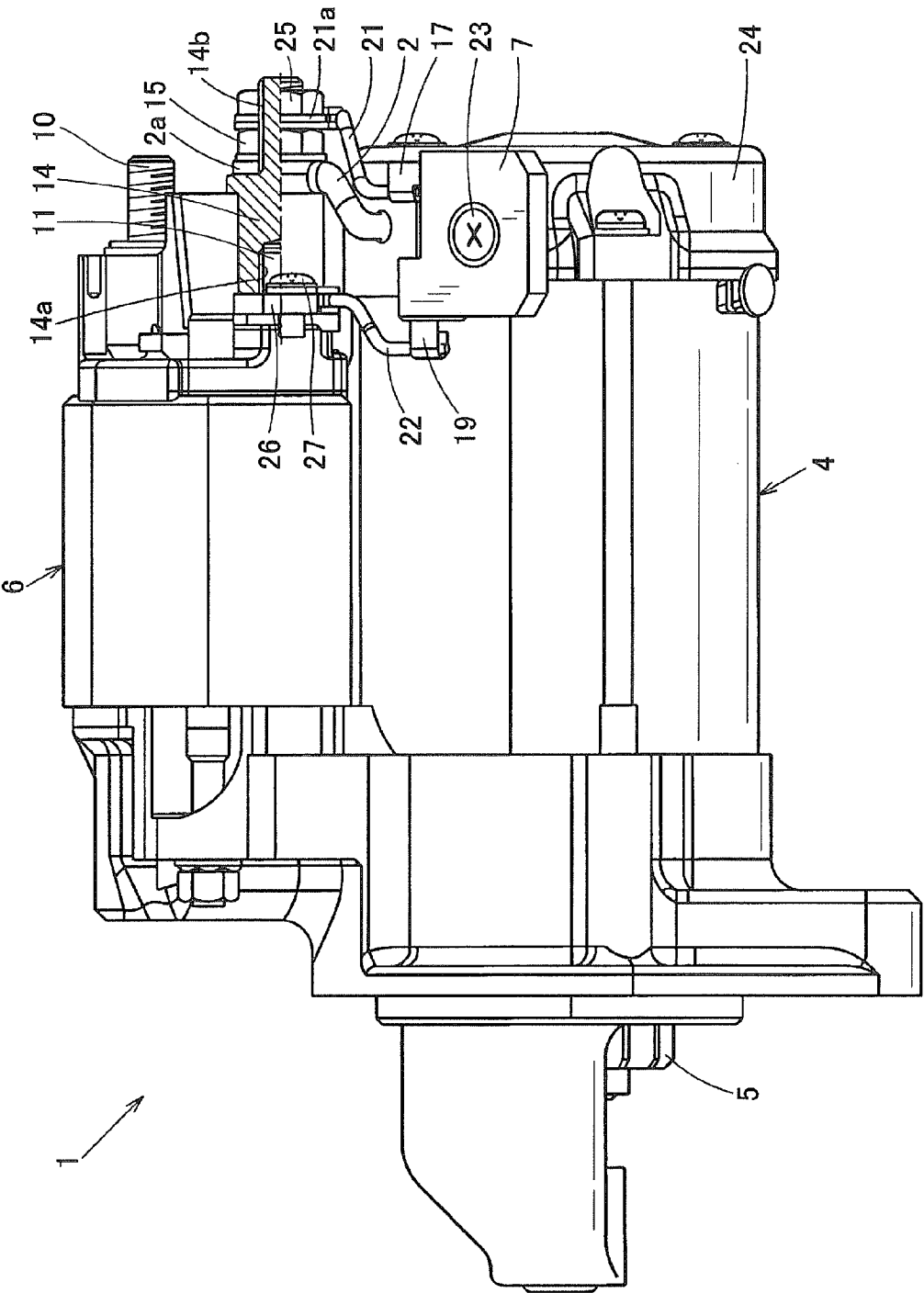
FIG. 3 is a side view of the starter in FIG. 1.

FIGS. 1 to 3 show an example of a noise reduction device (noise suppression device) used for a starter according to the present embodiment. The starter of the present embodiment can be applied to an on-vehicle engine system. As shown in FIG. 3, a starter 1 includes a motor 4, a pinion 5, an electromagnetic switch 6, and a noise reduction device 7. The motor 4 is connected to a power supply line 31 (see FIG. 1) via a motor lead line 2 and generates torque by receiving power supplied from a battery 3. The pinion 5 transmits torque from the motor 4 to a ring gear of an engine (not shown) mounted on a vehicle. The electromagnetic switch 6 connects and disconnects energization current to the motor 4. The noise reduction device 7 is able to reduce noise produced on rotation of the motor 4.

The motor 4 is a well-known commutator motor including a field, an armature, and a brush. The field is configured by a plurality of permanent magnets or field coils arranged on an inner circumference of a yoke forming a magnetic circuit. The armature is rotatably arranged on an inner circumference of the field and includes a commutator. The brush slides on an outer circumference of the commutator in conjunction with rotation of the armature.

The electromagnetic switch 6 includes a solenoid that forms an electromagnet by energization of an embedded coil and attracts a plunger by attractive force of the electromagnet. By on/off operation of the solenoid, i.e., excitation/non-excitation of the coil, the electromagnetic switch 6 opens and closes a main contact 9.

The main contact 9 is configured by a set of fixed contacts 12 and a moving contact 13 (see FIG. 1). The set of fixed contacts 12 are connected to the power supply line 31 via a battery side terminal bolt 10 and a motor side terminal bolt (hereinafter referred to as "M terminal bolt") 11. The moving contact 13 electrically connects and disconnects between the set of fixed contacts 12 in response to movement of the plunger. The moving contact 13 contacts the set of fixed contacts 12 to allow current to flow across the set of fixed contacts 12, thereby closing the main contact 9. On the other hand, the moving contact 13 moves away from the set of fixed contacts 12, thereby opening the main contact 9.

As shown in FIG. 1, the starter 1 of the present embodiment is provided with a conductor 14 which is a conductor component or part additionally inserted in the power supply line 31 of the motor 4 as an inductance component. The conductor 14 is composed of, e.g., iron, and has two ends, i.e., a cylindrically-shaped end (one end) and a rod-like shaped end (the other end), where a female screw 14a is formed on an inner circumference of the cylindrically-shaped end, and a male screw 14b is formed on an outer circumference of the rod-like shaped end. As shown in FIG. 3, the conductor 14 is attached by combining the female screw 14a with the M terminal bolt 11, and the male screw 14b is connected to the motor lead line 2. The conductor 14 is inserted between the M terminal bolt 11 and the motor lead line 2.

A ring-like terminal 2a is located at one end portion of the motor lead line 2 that is connected to the male screw 14b of the conductor 14. The ring-like terminal 2a is fitted in an outer circumference of the male screw 14b. After that, the conductor 14 is fixed by joining and tightening a nut 15 to the male screw 14b. The other end portion, i.e., an anti-terminal side end portion of the motor lead line 2 is connected to a positive side brush inside the motor 4. A field winding may be used as the field of the motor 4. If the field winding is used, such a configuration that connects the motor lead line 2 to the field winding may be adopted.

Next, the noise reduction device 7 will be described below.

As shown in FIG. 1, the noise reduction device 7 includes a capacitor C1, a resistor R, and two capacitors C2. The capacitor C1 is inserted between the ground (earth) and the other end (point A in FIG. 1) of the conductor 14 that is connected to the motor lead line 2. The resistor R is connected in series with the capacitor C1. The two capacitors C2 are inserted in parallel between the ground and one end (point B in FIG. 1) of the conductor 14 that is connected to the M terminal bolt 11.

The capacitor C1 has a capacitance of e.g., 4.7 nF and is used for reducing high-frequency noise that becomes a problem in a radio wave frequency band mainly used for FM (frequency modulation) broadcast. Each of the two capacitors C2 has a capacitance of e.g., 10 μF and is used for reducing low-frequency noise that becomes a problem in a radio wave frequency band mainly used for AM (amplitude modulation) broadcast.

The resistor R is used for reducing a decrease in an attenuation characteristic of the noise reduction device 7 due to parallel resonance. That is, when capacitors with the difference capacitance are connected in parallel with each other, anti-resonance is produced at an intermediate frequency between the respective self-resonant points, and then, the attenuation characteristic of the noise reduction device may be decreased. Then, in order to reduce unnecessary parallel resonance in parallel resonance frequency, the resistor is connected in series with the capacitor C1.

A resistance value of the resistor R corresponds to a value which is obtained by subtracting a sum of a resistance of e.g., wiring and an ESR (equivalent series resistance) of the respective capacitors C1 and C2 from a resistance value required to reduce parallel resonance. Here, the resistance value required to reduce parallel resonance is calculated based on (i) a total inductance obtained by summing all inductance included in a parallel resonance circuit and a sum of an ESL (equivalent series inductance) of the respective capacitors C1 and C2 and (ii) a composite capacitance of the capacitors C1 and C2.

As shown in FIG. 2, the capacitor C1, the resistor R, and the two capacitors C2 are incorporated in a package 16 which is made of for example, a resin package. The capacitor C1 and the two capacitors C2 are made of, for example, ceramic capacitors.

The capacitor C1 includes a capacitor body C1a and two lead terminals (hereinafter referred to as "first and second lead terminals C1ta and C1tb"). The capacitor body C1a has both ends EC1a and EC1b in a given direction (e.g., length or width direction). The first and second lead terminals C1ta and C1tb are extracted outward from the same end EC1a of the capacitor body C1a in the same direction with respect to the capacitor body C1a, as shown in FIG. 2.

The two capacitors C2 includes a capacitor body C2a and two lead terminals (hereinafter referred to as "first and second lead terminals C2ta and C2tb"). The capacitor body C2a has both ends EC2a and EC2b in a given direction (e.g., length or width direction). The first and second lead terminals C2ta and C2tb are extracted outward from the same end EC2a of the capacitor body C2a in the same direction with respect to the capacitor body C2a, as shown in FIG. 2.

The resistor R includes a resistor body Ra and two lead terminals (hereinafter referred to as "first and second lead terminals Rta and Rtb"). The resistor body Ra has both ends ERa and ERb in a given direction (e.g., length or width direction). The first and second lead terminals Rta and Rtb are extracted outward from the different ends ERa and ERb of the resistor body Ra in the opposite direction with respect to each other, as shown in FIG. 2.

In the package 16, a first positive electrode 17, an internal electrode 18, a second positive electrode 19, and a grounding electrode (earth electrode) 20 are inserted and fixed. The first positive electrode 17 is connected to one of the lead terminals Rta and Rtb of the resistor R. The internal electrode 18 is connected to the other of the lead terminals Rta and Rtb of the resistor R and one of the lead terminals C1ta and C1tb of the capacitor C1. The grounding electrode 20 is connected to the other of the lead terminals C1ta and C1tb of the capacitor C1 and one of the lead terminals C2ta and C2tb of the capacitors C2. The second positive electrode 19 is connected to the other of the lead terminals C2*ta* and C2*tb* of the capacitors C2.

In the capacitors C1, C2 and the resistor R, these respective lead terminals C1*ta*, C1*tb*, C2*ta*, C2*tb*, Rta, and Rtb are joined to the corresponding electrodes 17 to 20 by welding.

As shown in FIG. 2, the two capacitors C2 are arranged in a direction where the lead terminals C2*ta* and C2*tb* of one of the capacitors C2 face the lead terminals C2*ta* and C2*tb* of the other of the capacitors C2 across the second positive electrode 19 and the grounding electrode 20. Two joining areas between the lead tei inals C2*ta*, C2*tb* and the second positive electrode 19 are adjacent to two joining areas between the lead terminals C2*ta*, C2*tb* and the grounding electrode 20. According to this, a total of four joining areas of the lead terminals C2*ta*, C2*tb* of the respective capacitors C2 to the second positive electrode 19 and the grounding electrode 20 are joined in a single welding process.

After the lead terminals C1*ta*, C1*tb*, C2*ta*, C2*tb*, Rta, and Rtb are connected to the corresponding electrodes 17 to 20, a surface of the package 16 where the capacitors C1, C2 and the resistor R are incorporated is sealed by a cover.

The first positive electrode 17 is connected to point A in FIG. 1 via a branch wire 21, as shown in FIG. 3. The second positive electrode 19 is connected to point B via a branch wire 22, as shown in FIG. 3. The grounding electrode 20 is fixed to an end frame 24 which covers a rear end of the motor 4 by a screw 23, as shown in FIG. 3.

As shown in FIG. 3, an anti-electrode side end of the branch wire 21 is provided with a ring-like terminal 21*a* where the male screw 14*b* of the conductor 14 is fitted. The anti-electrode side end of the branch wire 21 is fixed by a tightening force of a nut 25 coupled to the male screw 14*b*.

An anti-electrode side end of the branch wire 22 is fixed to a connecting plate 26 coupled to the M terminal bolt 11, by a screw 27, as shown in FIG. 3.

In FIG. 1, L1 denotes an inductance component included in the branch wire 21, L2 denotes an inductance component included in the branch wire 22, and L3 and L4 represent an inductance component included in the respective electrodes 18, 19 and 20 of the noise reduction device 7.

According to the noise reduction device 7 of the present embodiment, the lead terminals C2*ta* and C2*tb* of the two capacitors C2 are joined to the second positive electrode 19 and the grounding electrode 20 by not soldering but welding. Due to this, even if the noise reduction device 7 is applied to the starter 1 that may be used under environment of severe temperature conditions, crack cannot be produced in the joining areas of the lead terminals C2*ta* and C2*tb*, thereby being able to tolerate a use under environment of severe cold conditions.

The two capacitors C2 are arranged in a direction where the lead terminals C2*ta*, C2*tb* of one of the capacitors C2 face the lead terminals C2*ta*, C2*tb* of the other of the capacitors C2 across the second positive electrode 19 and the grounding electrode 20. According to this, two junction areas of the lead terminals C2*ta*, C2*tb* with the second positive electrode 19 can be adjacent to two junction areas of the lead terminals C2*ta*, C2*tb* with the grounding electrode 20. Due to this, a total of four junction areas of the lead terminals C2*ta*, C2*tb* of the respective capacitors C2 with the second positive electrode 19 and the grounding electrode 20 can be joined in a single welding process, thereby being able to efficiently assemble the capacitors C2 at low cost.

The noise reduction device 7 is connected between both ends of the conductor 14 and the ground. According to this, the noise reduction device 7 can be arranged near the motor 4 which is a noise source.

The grounding electrode 20 is fixed to the end frame 24 of the motor 4 by the screw 23. According to this, a ground line can be shortened, thereby being able to efficiently reduce noise.

The conductor 14 to be an inductance component is inserted in the power supply line 31. According to this, an impedance of the noise reduction device 7 becomes relatively smaller than that of a starter equivalent circuit, thereby being able to improve its noise reduction effect.

The conductor 14 has the female screw 14*a* at one end side thereof. The female screw 14*a* is joined to the M terminal bolt 11. Due to this, the conductor 14 can be easily secured to the M terminal bolt 11.

The conductor 14 has the male screw 14*b* at the other end side thereof. The motor lead line 2 is connected to the M terminal bolt 11. Similar to this case, the male screw 14*b* of the conductor 14 is fitted in the ring-like terminal 2*a* of the motor lead line 2 and then the nut 15 is tightened. Due to this, the conductor 14 can be easily connected to the motor lead line 2.

The starter 1 may be mounted in an engine compartment. In this case, there is an enough space in an area around the M terminal bolt 11. Due to this, even if the conductor 14 is secured to the M terminal bolt 11, the starter 1 does not interfere with auxiliary component parts, an air supply pipe and an exhaust pipe, a cable, and so on located in an area around the engine, thereby having an advantage to mount the starter.

In the noise reduction device 7, the capacitor C1 with small capacitance (e.g., 4.7 nF) is inserted between the ground and the other end of the conductor 14 connected to the motor lead line 2 (point A in FIG. 1). Further, the two capacitors C2 with large capacitance (e.g., 10 μF) are inserted in parallel with each other between the ground and one end of the conductor 14 connected to the M terminal bolt 11 (point B in FIG. 1). This configuration of the capacitors C1, C2 can obtain the noise reduction effect in a broader frequency domain.

In the noise reduction device 7, the resistor R is connected in series with the capacitor C1. This configuration of the resistor R can reduce the composite impedance on parallel resonance, thereby being able to reduce a decrease in the attenuation characteristic of the noise reduction device 7 due to parallel resonance.

(Modifications)

In the starter 1 of the above embodiment, the M terminal bolt 11 of the electromagnetic switch 6 is provided with the conductor 14 to be an additional inductance component. Further, the male screw 14*b* of the conductor 14 is connected to the motor lead line 2.

The starter 1 is not limited to such a configuration that has the conductor 14, but may be applied to such a configuration that has no conductor 14, i.e., a starter configured in such a way that the M terminal bolt 11 is directly connected to the motor lead line 2. In this case, the noise reduction device 7 has a configuration that does not include the capacitor C1 described in the above embodiment. That is, the noise reduction device 7 includes only the two capacitors C2 which are connected in parallel with each other between the ground and the power supply line 31 of the motor 4.

The above embodiment specifies an arrangement of the two capacitors C2 with respect to the second positive electrode 19 and the grounding electrode 20, i.e., explains that the two capacitors C2 is arranged in a direction where the lead terminals C2*ta*, C2*tb* of one of the capacitors C2 face the lead terminals C2*ta*, C2*tb* of the other of the capacitors C2 across the second positive electrode 19 and the grounding electrode 20. A plurality of sets of the two capacitors C2 arranged in the same manner may be provided.

In the above embodiment, the resistor R is connected in series with the capacitor C1. The resistor R may be connected in in series with the two capacitors C2.

In the above embodiment, a capacitance of the capacitor C1 is 4.7 nF, and a capacitance of the respective capacitors C2 is 10 μF. These values of the respective capacitances are examples only.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A noise reduction device for a starter,
the starter including:
a motor that is connected to a power supply line via a motor lead line and produces torque by power supplied from a battery; and
an electromagnetic switch that includes an electric contact which is connected to the power supply line via a battery-side terminal and a motor-side terminal, and opens and closes the electric contact in conjunction with on-off operation of a solenoid,
the noise reduction device comprising:
a positive electrode that is connected to the power supply line via a branch wire;
a grounding electrode that is connected to ground via a motor body of the motor;
two capacitors that are connected in parallel with each other between the positive electrode and the grounding electrode; and
a package into which the positive electrode and the grounding electrode are inserted and fixed, the package holding the two capacitors,
wherein:
the two capacitors include a capacitor body and two lead terminals that are extracted from the capacitor body in the same direction with respect to the capacitor body;
the two capacitors are arranged in such a direction that the two lead terminals of one of the two capacitors face the two lead terminals of the other of the two capacitors across the positive electrode and the grounding electrode; and
the two lead terminals are joined to the positive electrode and the grounding electrode by welding.

2. The noise reduction device according to claim 1, wherein:
the positive electrode is connected to the motor-side terminal via the branch wire; and
the grounding electrode is fixed to an end frame of the motor by a screw.

3. The noise reduction device according to claim 1, further comprising:
a capacitor that are connected between the positive electrode and the grounding electrode, the capacitor having a first capacitance capable of reducing high-frequency noise, and the two capacitors having a second capacitance capable of reducing low-frequency noise.

4. The starter noise reduction device according to claim 1, wherein:
the starter further includes a conductor that is inserted between the motor-side terminal and the motor lead line as an inductance component capable of increasing an impedance of a starter equivalent circuit of the starter.

5. The noise reduction device according to claim 3, further comprising:
a resistor that is connected in series with at least one of the capacitor and the two capacitors.

6. The noise reduction device according to claim 4, wherein:
the conductor includes a female screw formed on an inner circumference of one end which is cylindrically-shaped and a male screw formed on an outer circumference of the other end which is rod-like shaped;
the female screw is joined to the motor-side terminal; and
the male screw is connected to the motor lead line.

* * * * *